(12) United States Patent
Kato

(10) Patent No.: US 7,892,695 B2
(45) Date of Patent: Feb. 22, 2011

(54) FUEL CELL STACK

(75) Inventor: Chisato Kato, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 796 days.

(21) Appl. No.: 11/885,435

(22) PCT Filed: Feb. 21, 2006

(86) PCT No.: PCT/JP2006/303521

§ 371 (c)(1),
(2), (4) Date: Aug. 31, 2007

(87) PCT Pub. No.: WO2006/093061

PCT Pub. Date: Sep. 8, 2006

(65) Prior Publication Data

US 2008/0220312 A1    Sep. 11, 2008

(30) Foreign Application Priority Data

Mar. 1, 2005    (JP)    ............................. 2005-056039

(51) Int. Cl.
*H01M 8/24*    (2006.01)
*H01M 8/02*    (2006.01)
*H01M 8/10*    (2006.01)

(52) U.S. Cl. ........................................ 429/510; 429/469
(58) Field of Classification Search ........................ None
See application file for complete search history.

(56) References Cited

U.S. PATENT DOCUMENTS

| 6,596,427 B1 * | 7/2003 | Wozniczka et al. ......... 429/435 |
| 7,226,684 B2 * | 6/2007 | Pflaesterer .................. 429/463 |
| 2001/0001052 A1 | 5/2001 | Bonk et al. |
| 2002/0031698 A1 * | 3/2002 | Inoue et al. .................... 429/35 |

FOREIGN PATENT DOCUMENTS

| DE | 101 21 176 A1 | 2/2002 |
| JP | 58-166676 A | 10/1983 |
| JP | 5-159794 A | 6/1993 |
| JP | 10-261426 A | 9/1998 |
| JP | 2001-332277 A | 11/2001 |
| JP | 2003-86229 A | 3/2003 |
| JP | 2004-193108 A | 7/2004 |
| JP | 2004-206986 A | 7/2004 |
| JP | 2004-311056 A | 11/2004 |
| WO | WO 99/27599 A1 | 6/1999 |
| WO | WO 00/74165 A1 | 12/2000 |

* cited by examiner

*Primary Examiner*—John S Maples
(74) *Attorney, Agent, or Firm*—Kenyon & Kenyon LLP

(57) ABSTRACT

In order to enable a fuel cell stack to be easily disassembled into a bundle of a plurality of cells and simultaneously to be handled while considering a unit cell as a unit, the fuel cell stack has a unit cell formed of an MEA and two facing separators which sandwich the MEA, and an adhesive layer for sealing a gap between the separators in the unit cell, and gaskets for sealing a gap between the unit cells, wherein each tacking force of the adhesive layer, and each gasket are different from each other depending on the position in a stacked direction of the unit cell.

25 Claims, 7 Drawing Sheets

PRIOR ART

FUEL CELL STACK

This is a 371 national phase application of PCT/JP2006/303521 filed 21 Feb. 2006, claiming priority to Japanese Patent Application No. 2005-056039 filed 1 Mar. 2005, the contents of which are incorporated herein by reference.

BACKGROUND OF THE INVENTION

The present invention relates to a fuel cell stack which generates electricity based on an electrochemical reaction between a fuel gas and an oxidizing gas, and to a seal structure between separators, in particular.

In general, a solid polymer type of a unit cell (unit battery) is composed of a membrane-electrode assembly (hereafter referred to as MEA; Membrane Electrode Assembly) consisting of an electrolyte membrane and a pair of electrodes arranged on both of the surfaces and a pair of separators sandwiching the MEA; and has a stacked shape as a whole. The unit cell generates an electric power between the electrodes when an oxidizing gas or a fuel gas is supplied to each of the electrodes through a gas channel formed in each separator.

A fuel cell with a stacked structure is composed by stacking a plurality of unit cells. As disclosed in Japanese Patent Laid-Open No. 2004-311056, for instance, a fuel cell stack is formed by arranging a terminal (electrode plate), an insulator and an end plate on both ends of a cell-stacked assembly in a cell-stacked direction, tightening the cell-stacked assembly in the cell-stacked direction, and fixing the cell-stacked assembly by using a fastener (tension plate, for instance) extending to the cell-stacked direction and a bolt on the outside of the cell-stacked assembly.

SUMMARY OF THE INVENTION

In the above described fuel cell stack, a multi-cell module is formed by stacking unit cells. Then, the unit cells are stacked by a method of holding each unit cell with an adhesive, or sealing a gap between unit cells by making them sandwich a gasket. However, the above methods have each problem as follow.

<In the Case of Structure in which Multi-Cell Modules are Held by Adhesive>

(1) Even when a manufacture problem has occurred in a particular unit cell of a multi-cell module, it is impossible to replace only the faulty portion because the multi-cell module cannot be disassembled, and accordingly the whole module is dealt as a faulty module. It is possible as well to select a unit cell having reliable cell performance and sealing performance, and subsequently re-bonding unit cells to each other to form a multi-module. However, insufficient sealing may occur in an adhesive layer in between the unit cells in the bonding step.

(2) FIG. 7 shows a state of unit cells which are bonded to each other with an adhesive 101. Separators 100 and 100 of the unit cell 102 and the unit cells 102 are bonded to each other with an adhesive, in the state in which an arbitrary surface pressure has been applied to them. When the surface pressure is removed after the bonding step, stress is generated in the separator 100 by a warping force of an MEA 103 or the like, as is shown in the figure. If the unit cells would be used each alone, the stress is offset by a warping force of the separator 100 and both forces are balanced at some degree of a deforming state. Accordingly, tensile stress equivalent to the surface pressure applied during the bonding step is not applied to the adhesive layer.

However, when each unit cell is fixed to each other with an adhesive to form a multi-module structure as is shown in the figure, the displacement of separators due to a warping force of the MEA is suppressed in the central part in a stacked direction of the module by an influence of the adjacent cells to each other, and an area of a portion at which the MEA contacts a separator increases. Accordingly, the same level of the tensile stress as a surface pressure applied during bonding is concentrated on the adhesive layer in the vicinity of the center of the multi-cell module. In addition, displacement amounts of the separators of the stacked cells are totalized at ends in the stacked direction, and shear stress in addition to the tensile stress is generated in the adhesive layer.

In other words, a multi-module structure requires higher displacement resistance, adhesive strength and material strength in order to endure the surface pressure than a stack formed of a unit cell.

(3) The structure uses the increased number of components, and results in increasing a fraction defective, because a non-defective product rate of each component is multiplied.

<In the Case of Structure in which Multi-Cell Modules are Held Only by Gasket>

(1) When the structure is disassembled, all the stacked components come apart, and the structure is hardly handled with each unit cell.

(2) A cell performance and sealing performance cannot be determined before all the components are stacked, and when replacing a faulty portion, all the components need to be once disassembled.

The present invention is designed with respect to the above described circumstances, and is directed at providing a fuel cell stack which can be easily disassembled into a bundle of a plurality of unit cells and besides can be handled while considering a unit cell as a unit.

In order to solve the above described problem, a fuel cell stack according to the present invention has a unit cell formed of stacked ion-exchanger and separators (for instance, a unit cell formed of the ion-exchanger sandwiched by two separators facing to each other) and a sealing portion for sealing the gap between the unit cells, wherein the sealing portions have different tacking forces depending on the position in a stacked direction of the unit cells.

A fuel cell stack according to the present invention has, for instance, a sealing portion having a relatively weak tacking force (or having no tacking force) and a sealing portion having a relatively strong adhesive force arranged therein. The sealing portion having the strong tacking force shall have such a level of strength as to keep the sealed state unless the fuel cell stack would be positively separated. Then, unit cells are easily separated in the sealing portion having the weak tacking force, whereas the unit cells are not easily separated in the sealing portion having the strong tacking force. Thereby, the fuel cell stack can possess both of disassembly easiness and a power of holding the unit cells.

In other words, the fuel cell stack may have a structure provided with sealing potions having different tacking forces imparted at every predetermined unit cell (at every predetermined number of unit cell). The fuel cell stack having such a structure may further have sealing portions having differently low (weak) tacking forces imparted at every predetermined unit cell (at every predetermined number of unit cell).

As for means for imparting different tacking forces to sealing portions, when the fuel cell stack has a sealing portion formed, for instance, by bringing a gasket in contact with a separator, the sealing portion may be formed by imparting different tacking forces to gaskets depending on the position in a stacked direction of unit cells and/or by imparting different tacking forces to separators which gaskets contact, depending on the position of the sealing portions in a stacked direction of unit cells. A sealing portion having a strong tacking force may employ an adhesive.

The above described sealing portions have different tacking forces depending on the position in a stacked direction of the above described unit cells, and have a portion at which a first tacking force working in between one unit cell and a unit cell stacked on one side in the stacked direction is weaker than a second tacking force working in between the above described one unit cell and a unit cell stacked on the other side in the stacked direction, wherein the above described second tacking force may be equal to or weaker than a tacking force working in the above described unit cell.

A fuel cell stack according to the present invention has a unit cell formed of stacked ion-exchanger and separator (for instance, a unit cell formed of the ion-exchanger sandwiched by two separators facing to each other), and a gasket for sealing the gap between separators in the unit cell or between the unit cells, wherein the sealing portions using the gasket have different tacking forces depending on the position in a stacked direction of the unit cells.

A fuel cell stack according to the present invention, for instance, makes a sealing portion having a relatively strong tacking force seal a gap between separators of a unit cell, and makes a sealing portion having a relatively weak tacking force (or having no tacking force) seal the gap between the unit cells. The bonding strength of the sealing portion having the strong tacking force is such a level as to keep a bonded state unless the sealing portion would be tried to be positively separated. Thereby, every unit cell can be easily separated from each other but the separators composing the unit cell are not separated from each other. Accordingly, the fuel cell stack can possess both of disassembly easiness and a power of holding the unit cells.

In other words, the fuel cell stack may have a structure provided with sealing potions having different tacking forces imparted at every predetermined unit cell (at every predetermined number of unit cells). The fuel cell stack having such a structure may further have sealing portions having differently low (weak) tacking forces imparted at every predetermined unit cell (at every predetermined number of unit cell).

As for means for imparting different tacking forces to sealing portions, the sealing portion may be formed by imparting different tacking forces to gaskets depending on the position in a stacked direction of unit cells and/or by imparting different tacking forces to separators which gaskets contact, depending on the position of the sealing portions in a stacked direction of unit cells.

Specifically, the sealing portion can adopt the following structures, for instance.

Some gaskets may generate a stronger intermolecular force or form a stronger intermolecular bond with an opposite member (separator) contacting the gasket than the other gaskets. Alternatively, some gaskets may have adherence on its surface or an opposite member (separator) contacting the gasket may have the adherence on its surface.

In addition, some gaskets may have fine recesses formed on its surface, or an opposite member (separator) contacting some gaskets may have the surface mirror finished.

Furthermore, some gaskets may generate a weaker intermolecular force or form a weaker intermolecular bond with an opposite member (separator) contacting the gasket than the other gaskets. Alternatively, an opposite member (separator) contacting some gaskets may have a rougher surface than the other opposite member (separator).

A fuel cell stack having the above described structure may control, for instance, a tacking force (A) working in a unit cell, a tacking force (B) working in between the unit cells in a module provided with a plurality of the unit cells, and a tacking force (C) working in between the above described modules, so as to satisfy a relationship of tacking force (A)≧tacking force (B)>tacking force (C).

In addition, the fuel cell stack having the above described structure further has a plurality of modules each of which is formed of a plurality of unit cells by sealing the gaps between the unit cells with a tacking force (B) that is equal to or lower than a tacking force (A) working in the unit cell, wherein a tacking force (C) working in between the adjacent modules may be weaker (lower) than the tacking force (B) working in between the unit cells.

Furthermore, the fuel cell stack having the above described structure may have a portion at which a tacking force working in between one unit cell and a unit cell stacked on one side in a stacked direction is weaker (lower) than a tacking force working in between the one unit cell and a unit cell stacked on the other side in the stacked direction.

The fuel cell stack having the above described structure can individually separate each module from itself, separate each unit cell from the module, and separate each of an ion-exchanger and separators from the unit cell.

A sealing portion using the above described gasket is composed of the gasket and a contacting portion of the above described separator, which contacts the head of the gasket, and may have a different tacking force depending on the position in a stacked direction of the above described unit cells.

DETAILED DESCRIPTION

Hereinafter, a fuel cell stack according to the preferred embodiment of the present invention will be described with reference to the accompanying drawings. Hereinafter, a solid polymer electrolyte type of a fuel cell stack will be taken as an example and will be described, but the present invention is not limited to the example.

First Embodiment

Figure 1:
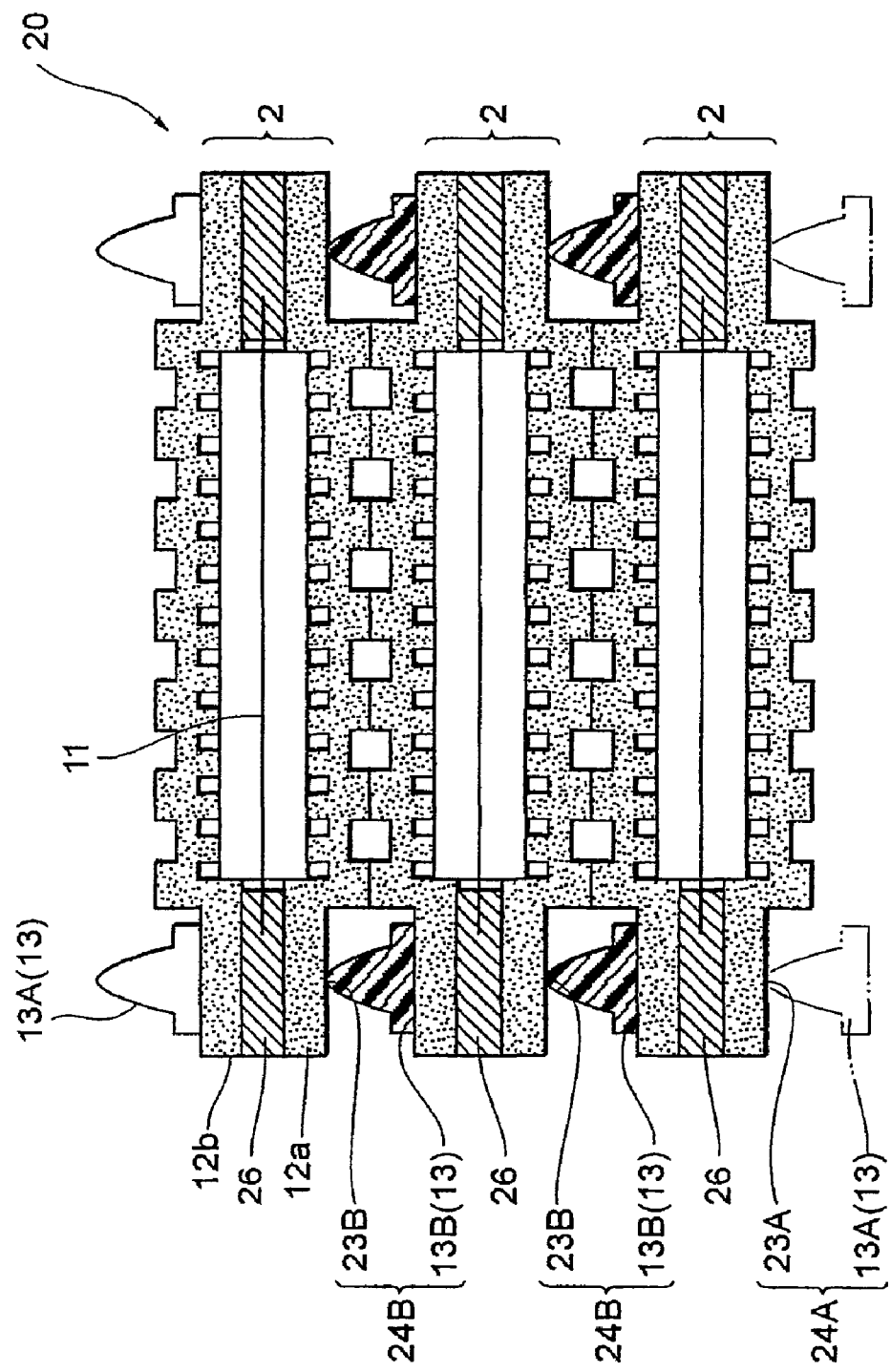
FIG. 1 is a side view of a unit cell contained in a fuel cell stack shown as a first embodiment of the present invention.
Figure 2:
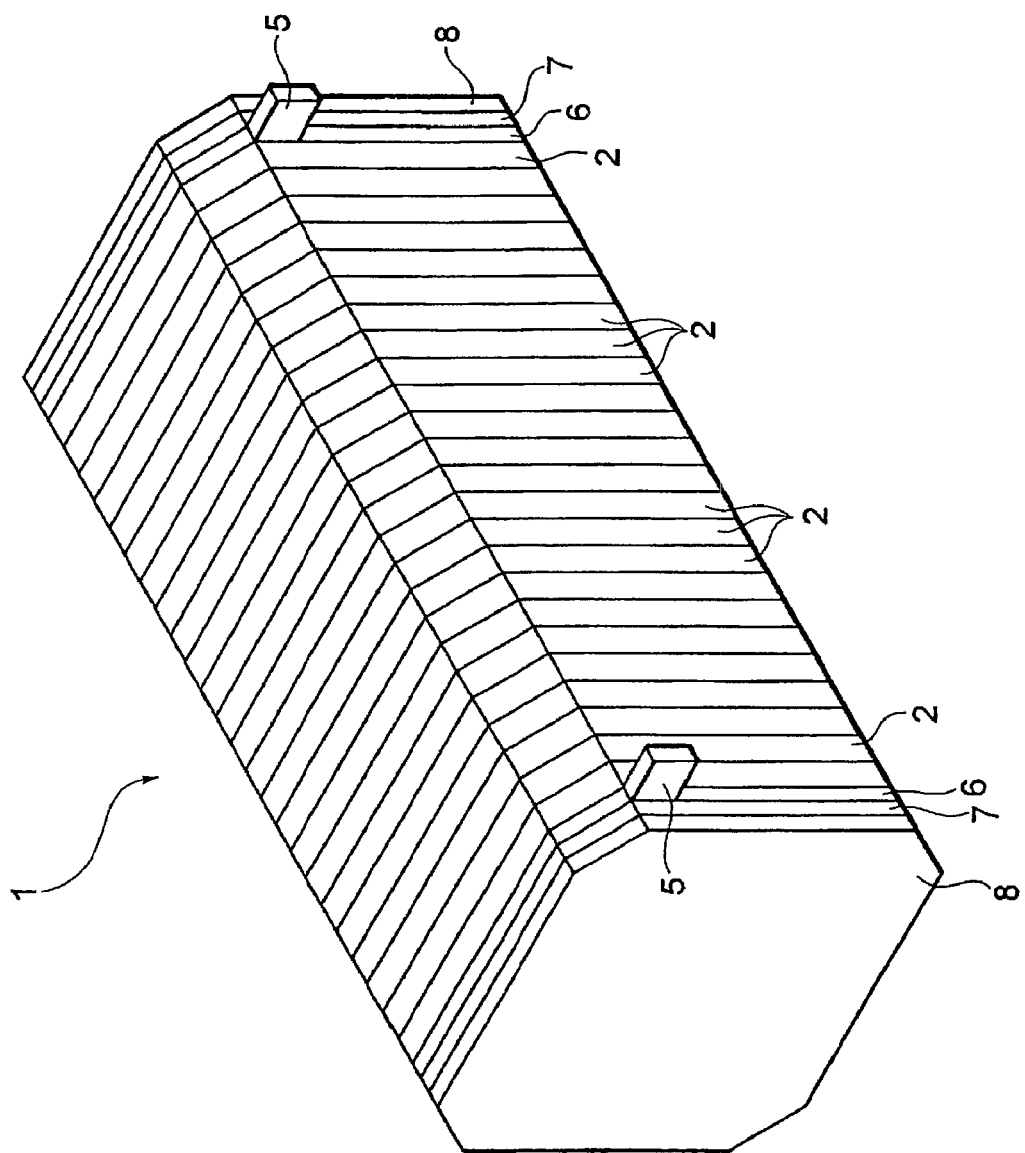
FIG. 2 is a total schematic view illustrating a structure of a fuel cell stack.

FIG. 1 is a side view of a unit cell contained in a fuel cell stack illustrated as a first embodiment of the present invention. FIG. 2 illustrates the total structure of the fuel cell stack. As illustrated in the figures, the fuel cell stack 1 is composed by the steps of: stacking a plurality of unit cells 2; and sequentially arranging each of a current collector 6 with an output terminal 5, an insulating sheet 7 and an end plate 8 on the outside of the unit cells 2 located on both ends. The fuel cell stack 1 is in a compressed state by a predetermined force in a stacked direction of the unit cells 2, by spanning a tension plate which is not illustrated in the figure across both end plates 8, for instance, and fixing the tension plate to each of the end plates 8 with a bolt.

Figure 3:
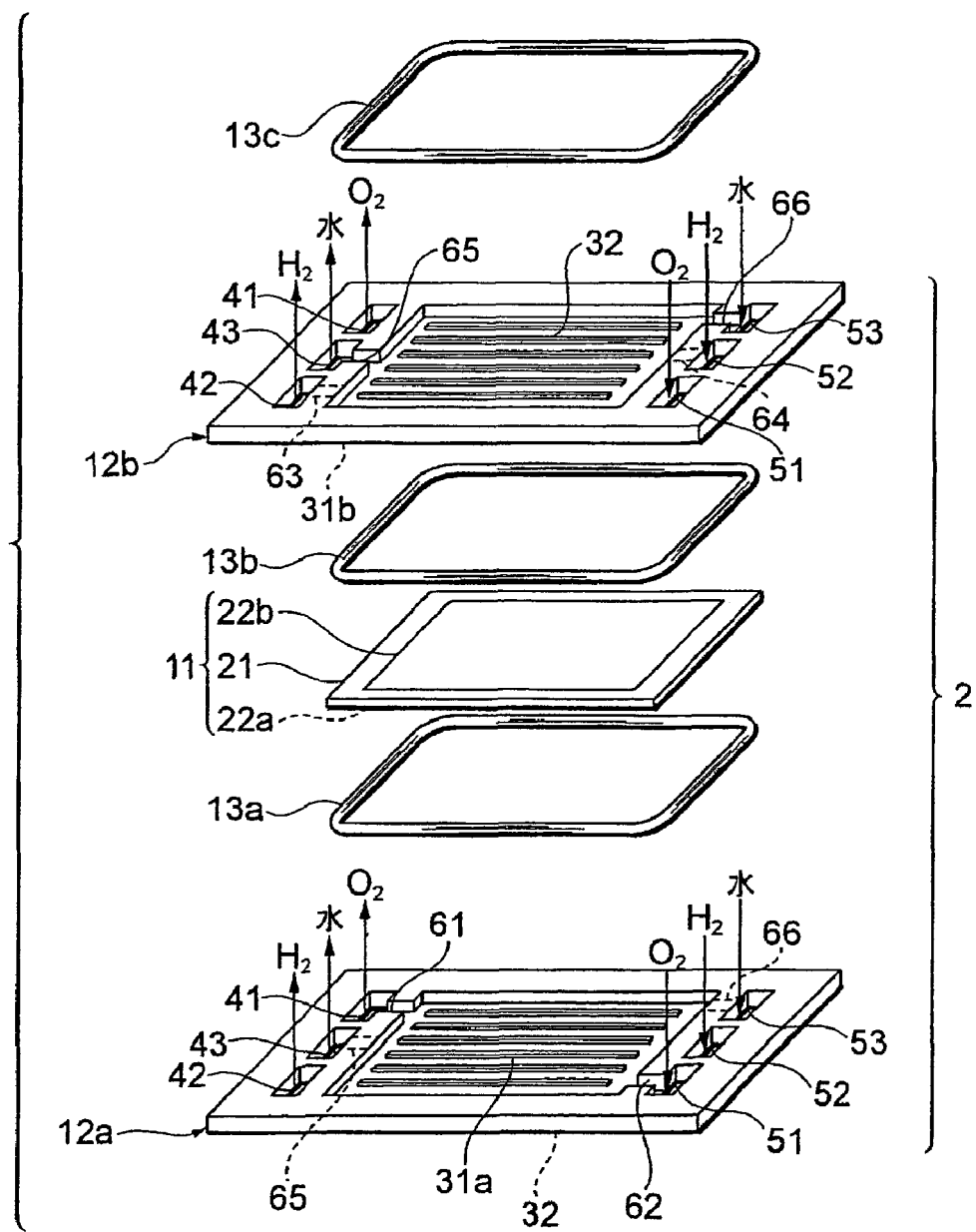
FIG. 3 is an exploded perspective view illustrating a disassembled state of a unit cell in a fuel cell stack.

As is illustrated in FIG. 3, a unit cell 2 according to the present embodiment is composed of an MEA (ion-exchanger) 11 and a pair of separators 12a and 12b which sandwich MEA 11 (composed of the separators 12a and 12b arranged on both sides of the MEA 11), and has a stacked shape as a whole. The MEA 11 and the respective separators 12a and 12b are a generally planar component and have an outer shape of a rectangle (oblong) when viewed from the top. The MEA 11 has an outer shape formed so as to be slightly smaller than that of each of the separators 12a and 12b. The MEA 11 and the separators 12a and 12b are adhesively bonded in a peripheral line of them.

The MEA 11 is composed of an electrolyte membrane 21 made of an ion-exchange membrane which is a high polymeric material and a pair of electrodes 22a and 22b (cathode and anode) which sandwich the electrolyte membrane 21 from both sides, and has a stacked shape as a whole. Each of the electrodes 22a and 22b is joined to the electrolyte membrane 21 with a hot pressing technique, for instance.

The electrodes 22a and 22b are made from a porous carbonaceous material (diffusion layer) provided with a catalyst such as platinum. An oxidizing gas such as air and an oxidizing agent is supplied to one electrode 22a (cathode), and a hydrogen gas is supplied to the other electrode 22b (anode) as a fuel gas. An electrochemical reaction between the two gases occurs in the MEA 11 and the unit cell 2 obtains an electromotive force.

Each of separators 12a and 12b is made from a gas-impermeable electro-conductive material. The electro-conductive material includes a metal such as aluminum and stainless steel as well as carbon and a rigid resin having electro-conductivity.

The separators 12a and 12b have a plurality of concavities and convexities on each of the front and back faces formed by press-forming a part facing electrodes 22a and 22b, or by forming a groove and/or a protrusion in the front and back faces of the part facing the electrodes 22a and 22b. A plurality of the salients and recesses each extend in one direction to form a gas channel 31a for an oxidizing gas, a gas channel 31b for a hydrogen gas and a channel 32 for cooling water.

Specifically, a separator 12a has a plurality of the straight gas channels 31a for the oxidizing gas formed on the inner surface which is an electrode 22a side, and a plurality of the straight channels 32 for cooling water formed on the outer surface which is the opposite side of the inner surface. Similarly, the separator 12b has a plurality of straight gas channels 31b for hydrogen gas formed on an inner surface which is an electrode 22b side, and a plurality of the straight channels 32 for cooling water formed on the outer surface which is the opposite side of the inner surface.

The two gas channel 31a and the gas channel 31b in a unit cell 2 extend in parallel in the same direction, and face each other so as to sandwich the MEA 11 and so as not to deviate from the correct position. Then, two adjacent unit cells 2 form communicating channels 32 for cooling water with a square cross section in between the unit cells, when the outer surface of the separator 12a of one unit cell 2 is butted against an outer surface of the separator 12b of the next unit cell 2.

Separators 12a and 12b have a manifold 41 of an inlet side for an oxidizing gas, a manifold 42 of an inlet side for hydrogen gas and a manifold 43 of an inlet side for cooling water, which are formed in one end of the separators 12a and 12b in a longitudinal direction, have a rectangular shape and penetrate each of the separators 12a and 12b. The separators 12a and 12b have a manifold 51 of an outlet side for the oxidizing gas, a manifold 52 of an outlet side for hydrogen gas and a manifold 53 of an outlet side for cooling water, which are formed in the other end of the separators 12a and 12b in a longitudinal direction, have a rectangular shape and penetrate each of the separators 12a and 12b.

The manifold 41 and the manifold 51 for the oxidizing gas in the separator 12a communicate with a gas channel 31a for the oxidizing gas, through a communication channel 61 of the inlet side and a communication channel 62 of the outlet side, which are formed into a groove shape in the separator 12a. Similarly, the manifold 42 and the manifold 52 for hydrogen gas in the separator 12b communicate with a gas channel 31b for the hydrogen gas, through a communication channel 63 of the inlet side and a communication channel 64 of the outlet side, which are formed into a groove shape in the separator 12b.

A manifold 43 and a manifold 53 for cooling water in each of separators 12a and 12b communicate with a channel 32 for cooling water, through a communication channel 65 of an inlet side and a communication channel 66 of an outlet side, which are formed into a groove shape in each of the separators 12a and 12b.

In addition, a frame-shaped gasket 13 made from silicone rubber, for instance, is arranged in between a separator 12a and a separator 12b of adjacent unit cells 2. The gasket 13 is arranged between the surface at a position deviated from a channel 32 for cooling water in a separator 12a and the surface at a position deviated from a channel 32 for cooling water in a separator 12b, and seals the gap between them.

Figure 4:
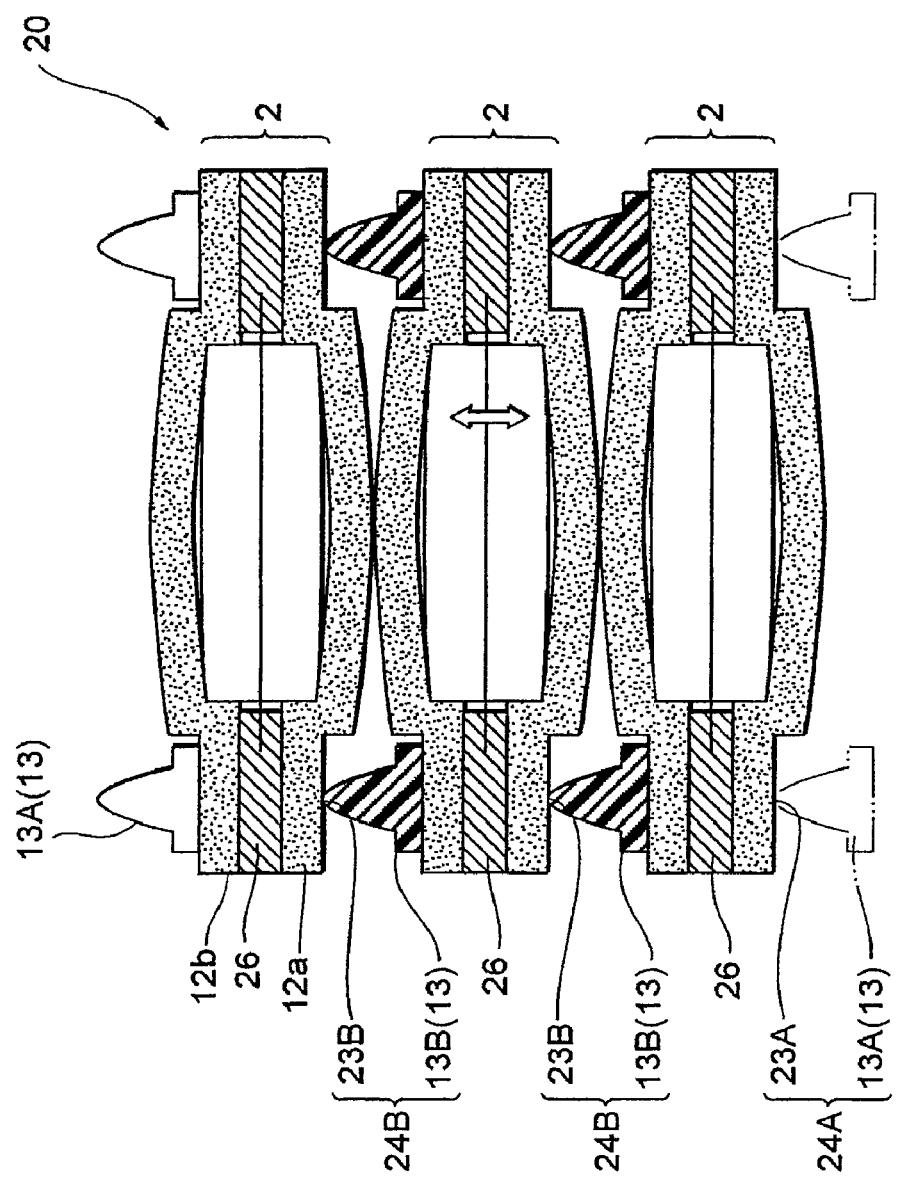
FIG. 4 is a side view illustrating a deformed state of a unit cell.

FIG. 1 and FIG. 4 are sectional side views for a stacked state of unit cells 2 composed as described above. FIG. 4 illustrates a deformed state of the unit cell 2 of FIG. 1, after a surface pressure acting on the fuel cell stack for bonding a separator has been released. As discussed above, the fuel cell stack is based on a unit cells structure in which the unit cell 2 is composed of the separators 12a and 12b that sandwich an MEA 11 are adhesively bonded to each other through an adhesive layer 26, and a gap between the unit cells 2 is sealed by a gasket 13.

A gasket 13 is configured so as to seal a gap between the unit cells 2, by being adhesively bonded to a separator 12b, and bringing the head in contact with a separator 12a of the other opposing unit cell 2. A fuel cell stack 1 according to the present embodiment is a three-cell one-module type which is composed of one module 20 formed of three unit cells 2.

However, a fuel cell stack according to the present invention is not limited to the three-cell one-module type in which three unit cells 2 compose one module as in the present embodiment, but may be a two-cell one-module type, or may be a type in which four or more unit cells 2 compose one module.

Two gaskets 13A and 13B are used as gaskets 13, which have different adhesive forces from each other according to the position in a stacked direction of a unit cell 2. One gasket 13A is arranged at every module 20, specifically, is arranged on a unit cell 2 located at the top of a module 20 in a cell-stacked direction, and the gasket 13B seals gaps between the other unit cells 2, specifically, seals the gaps between the unit cells 2 in the module 20.

A sealing portion 24A is composed of the gasket 13A and a contacting portion 23A of a separator 12a, which contacts a head of the gasket 13A. Similarly, a sealing portion 24B is composed of the gasket 13B and a contacting portion 23B of a separator 12a, which contacts a head of the gasket 13B.

A tacking force (adhesive force B) of the sealing portion 24B, which is the tacking force between the gasket 13B and the contacting portion 23B, is stronger than a tacking force (adhesive force C) of the sealing portion 24A, and the tacking force (adhesive force A) of an adhesive layer 26, which is the tacking force between separators 12a and 12b, is stronger than that of the sealing portion 24B.

As described above, in a fuel cell stack 1 according to the present embodiment, the adhesive force (C) between a unit cell 2 shown in the bottom in the stacked direction in FIG. 1 and an unshown unit cell 2 stacked in a lower side of the above unit cell 2 in the stacked direction (in one side in the stacked direction) is weaker than the adhesive force (B) between the unit cell 2 shown in the bottom in the stacked direction and the unit cell 2 stacked in the upper side of the unit cell 2 in the stacked direction (in the other side in the stacked direction). There exist a plurality of such sealing portions in the fuel cell stack 1 as having the above relationship of adhesive forces.

The strength of a tacking force of the sealing portion 24B shall be such a strength as the bonded state is kept unless the sealing portion would not be positively separated. The strength of the sealing portion 24A shall be such a strength as can be easily separated.

As a method for imparting a strong tacking force to a sealing portion 24B, specifically a method for imparting the tacking force to the surface of a gasket 13B, and/or a method for imparting the tacking force to a contacting portion 23B of a separator 12a, there can be adopted the following means:

(1) facilitating the gasket 13B to easily adhere with an opposite contact member (the contacting portion 23B of the separator 12a) through an intermolecular force, by making the cross-linking density in the material of the gasket 13B unbalanced;

(2) imparting the surface of the gasket 13B a sucking effect due to fine recesses formed on the surface, by roughening the surface into a satin form;

(3) arranging a resin material having adherence on the surface of the gasket 13B;

(4) giving a highly active functional group on the surface layer of the contacting portion 23B;

(5) arranging a resin material having adherence on the surface of the contacting portion 23B; and (6) improving the adhesiveness of the surface of the contacting portion 23B, by mirror finishing the surface.

As a method for imparting a low tacking force to a sealing portion 24A, specifically a method for reducing the tacking force of the surface of a gasket 13A, and/or a method for reducing the tacking force of a contacting portion 23A of a separator 12a, there can be adopted the following means:

(1) inhibiting the gasket 13A from generating an intermolecular force with an opposite contact member (contacting portion 23A), by balancing a crosslink density of the gasket 13A or inactivating the gasket 13A to decrease the number of remaining functional groups on the surface;

(2) suppressing the gasket 13A from bonding to the opposite member through an intermolecular bonding force, by vapor-depositing an inactive silica powder on the surface of the gasket 13A or by a similar method;

(3) suppressing the gasket 13A from bonding to the opposite member through the intermolecular bonding force, by applying grease or oil onto the surface of the gasket 13A to cover the remaining functional groups;

(4) inhibiting the contacting portion 23A from generating an intermolecular force with an opposite contact member, by decreasing the number of remaining functional groups on the surface with inactivation treatment or the like;

(5) suppressing the contacting portion 23A from bonding to the opposite member through the intermolecular bonding force, by applying grease, oil or a mold release agent onto the surface of the contacting portion 23A to cover the remaining functional groups; and (6) forming voids at a portion contacting with the gasket 13A in the contacting portion 23A, by aggravating the surface roughness (property) of the surface of the contacting portion 23A in comparison with the contacting portion 23B, so as to lower the adhesiveness.

In a fuel cell stack 1 according to the present embodiment configured as described above, a gap between unit cells 2 is sealed not by an adhesive but by a gasket 13. In the fuel cell stack 1, a sealing portion 24B at which unit cells are bonded with a relatively stronger tacking force than that at a sealing portion 24A is not separated by a weak force but can be separated by such a peeling force as to overcome the tacking force, and can be bonded with the same tacking force as in a state before having been separated, when the unit cells are stacked again. On the other hand, the sealing portion 24A can be separated more easily than the sealing portion 24B. In addition, the sealing performance of the sealing portions 24A and 24B are secured by a surface pressure caused by a reaction force of gaskets 13A and 13B.

On the other hand, a separator 12a and a separator 12b in each unit cell 2 are mutually fixed by an adhesive layer 26 formed by the solidification of an adhesive. The sealing performance is secured by the adhesive bonding force.

Accordingly, the present fuel cell stack 1 can show the following effects. Each module 20 can be easily separated from the others, since a sealing portion 24A can be easily separated because of having a weak tacking force. Each unit cell 2 in the module 20 is not easily separated from the others because a sealing portion 24B has a strong tacking force, but can be separated from each other if a positively separating force would be applied to the sealing portion 24B. Accordingly, the fuel cell stack 1 has an advantage in which every unit cell 2 can be separated from each other by separating the sealing portion 24B having the strong tacking force, while possessing an advantage of a multi-cell module structure, specifically, an advantage of reducing the number of components and configured channels, reducing a stacking length by compressing a thickness of a cell and facilitating the handling of the components, by forming the module from a manageable number of components though the fuel cell stack 1 is composed of many components. In other words, the fuel cell stack 1 shows an effect of warranting the quality while considering a unit cell 2 as a unit and being capable of handling every module 20 individually.

Thus, when a problem has occurred in a particular unit cell of a multi-cell module, the fuel cell stack 1 in the present embodiment can be disassembled into every module 20 and each unit cell 2, and only the faulty portion can be replaced. In addition, because sealing portions 24A and 24B can be easily bonded and separated, the unit cells having a cell performance and a sealing performance warranted can be sorted without causing a problem in the sealing performance, and then can be adhesively bonded again to form a multi-module structure. Accordingly, even when a problem has occurred in a particular unit cell while manufacturing the fuel cell stack, the whole fuel cell stack does not become a defective product, and a fraction defective can be reduced.

In addition, the fuel cell stack seals gaps between unit cells 2 not by an adhesive but by a gasket 13, as is illustrated in FIG. 4, so that stress generated between separators 12a and 12b offsets warping forces of the separators 12a and 12b, and each of the unit cells 2 is brought into a well-balanced state. In other words, the fuel cell stack can inhibit a tensile stress from concentrating in a central part in a module-stacked product, which has occurred in a conventional product. Furthermore, the fuel cell stack can inhibit the generation of a shearing stress as well, because a displacement amount of a separator is not accumulated.

Second Embodiment

In the next place, the second embodiment of the present invention will be described. The fuel cell stack in the second embodiment basically has the same structure as in the above described first embodiment. Accordingly, the same reference character will be put on the same structure and the description of the structure will be omitted.

Figure 5:
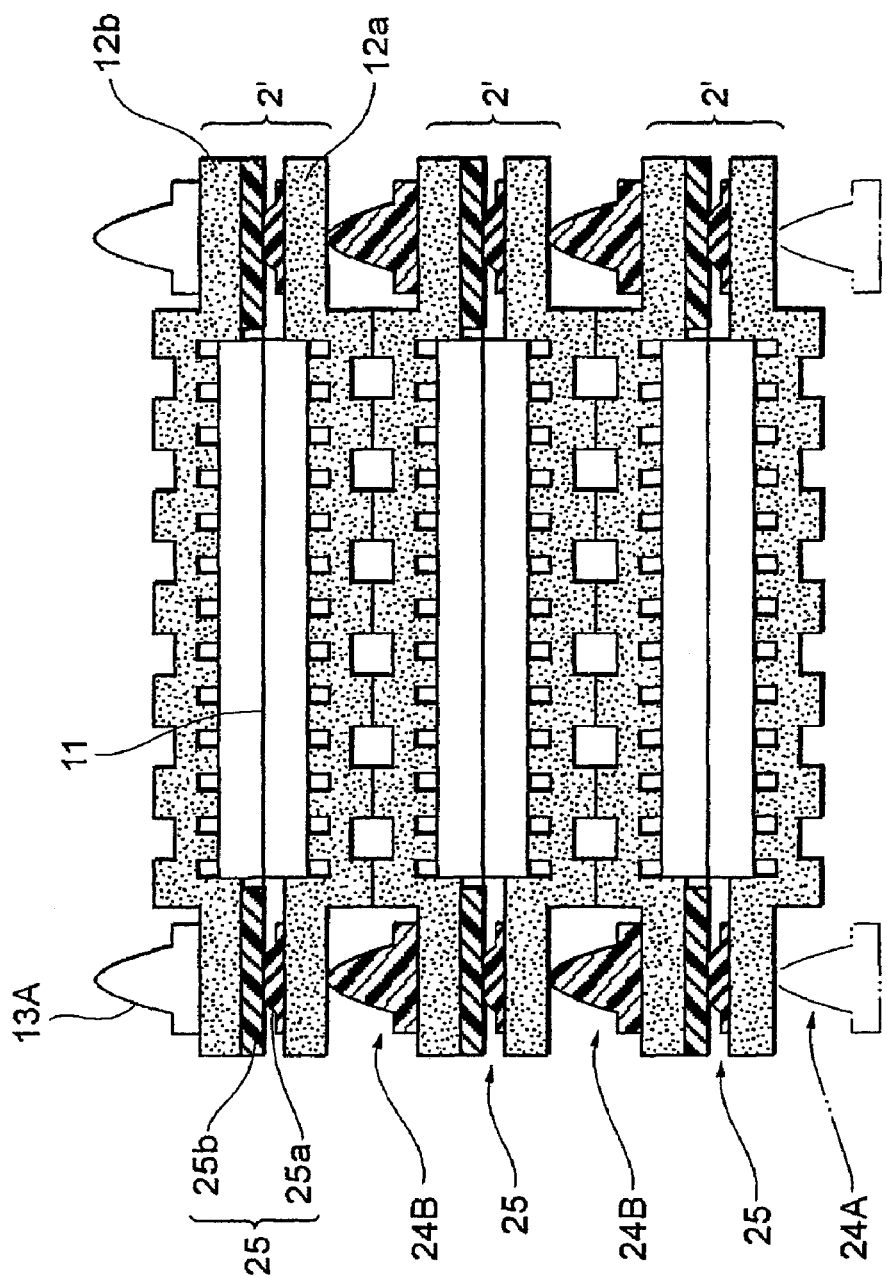
FIG. 5 is a side view of a unit cell contained in a fuel cell stack shown as a second embodiment of the present invention.

FIG. 5 is a sectional side view showing a stacked state of unit cells 2' in a fuel cell stack according to the present embodiment. The fuel cell stack in the present embodiment employs basically a stacked structure in which gaskets seal all gaps among MEA 11 and separators 12a and 12b in the unit cell 2' and all gaps between the separator 12b and the separator 12a of adjacent unit cells 2'. In other words, in addition to the above described gaskets 13A and 13B, a sealing portion 25 seals a gap between the separator 12a and the separator 12b which sandwich the MEA 11, in each of the unit cells 2'.

The sealing portion 25 is composed of a gasket 25a which is adhesively bonded to the separator 12a side and a sealing material 25b which faces to the gasket 25a and is adhesively bonded to the separator 12b. These gaskets 25a and 25b are made from silicone rubber, for instance.

The sealing portion 25 has such a strength of a tacking force similar to a sealing portion 24B as the bonded state is kept unless the sealing portion 25 would be positively separated. The same means as the means of applying the tacking force in the gasket 13B and a contacting portion 23B in the above described first embodiment is adopted as the means of applying the tacking force to the gasket 25a and the sealing material 25b.

In the present embodiment, a sealing performance in each of unit cells 2' is warranted by a surface pressure caused by a reaction force of a gasket 25a.

Figure 6:
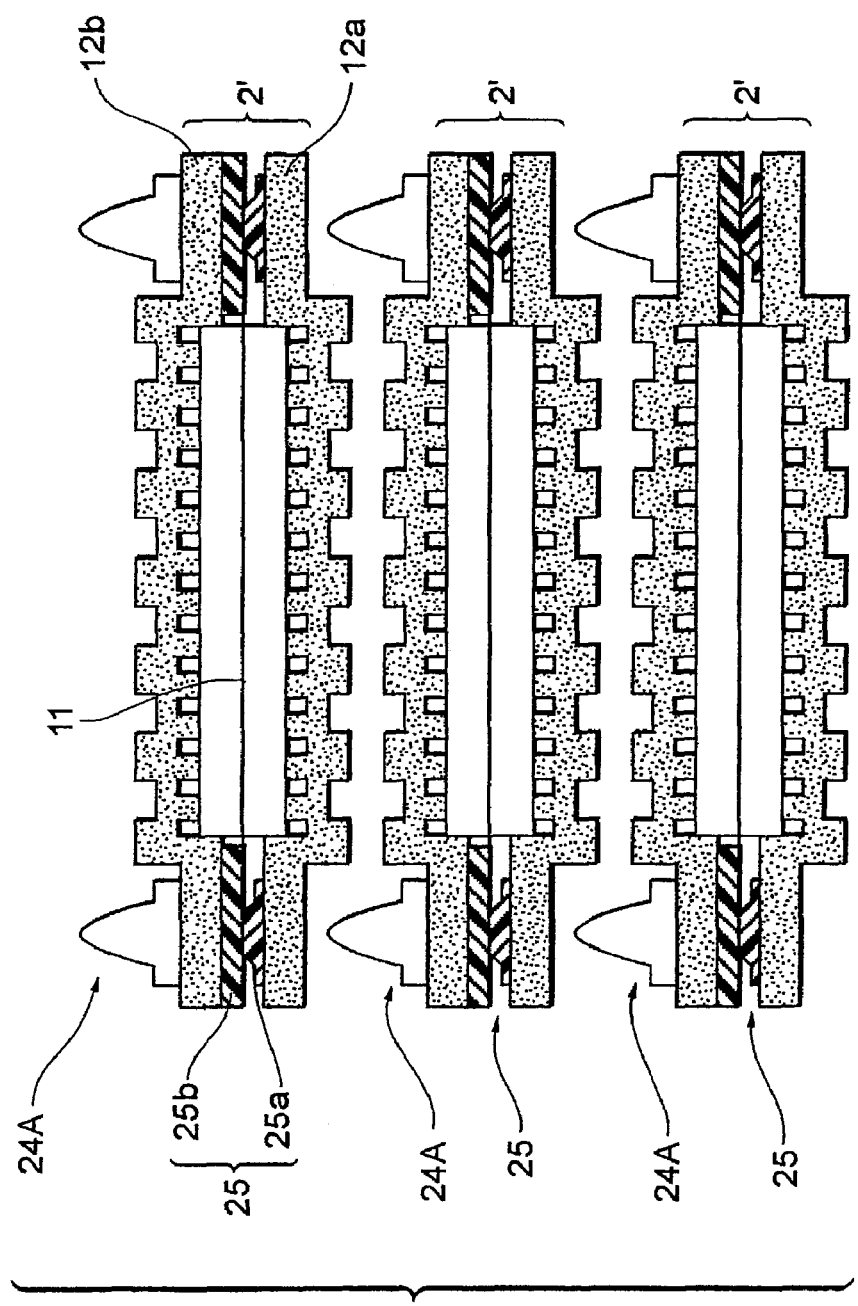
FIG. 6 is a side view illustrating a modified example of a fuel cell stack.
Figure 7:
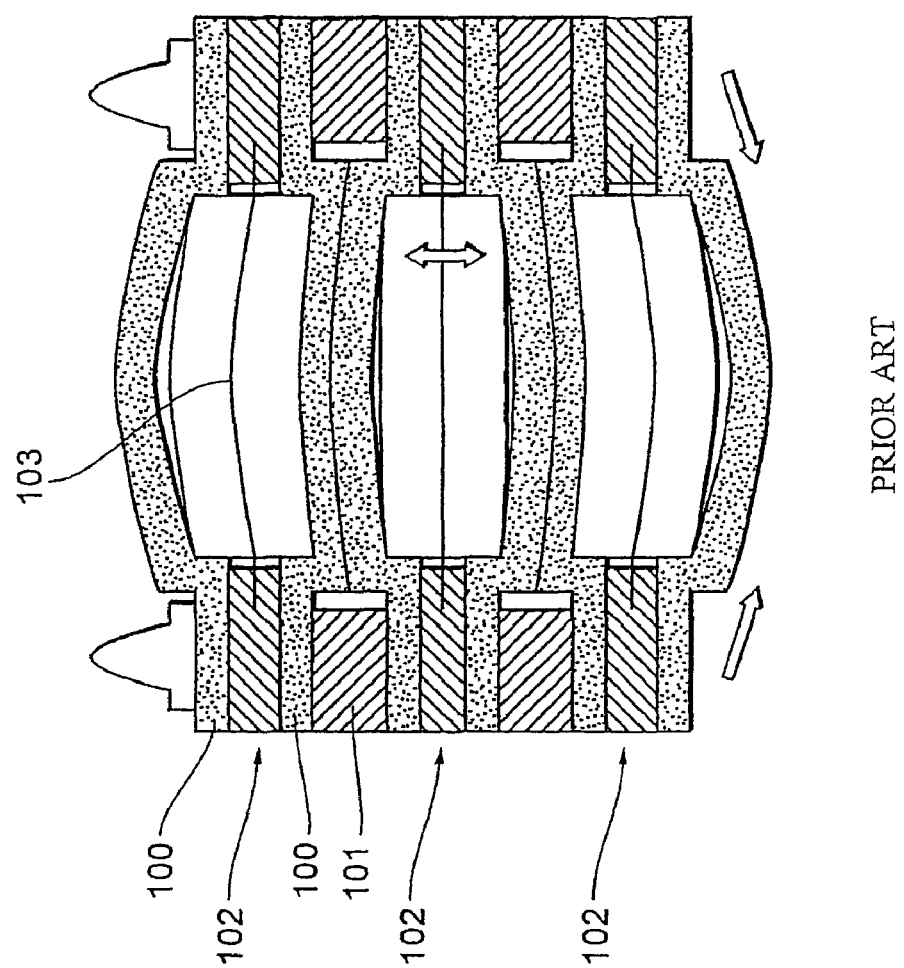
FIG. 7 is a sectional side view illustrating a unit cell of a conventional fuel cell stack.

FIG. 6 illustrates a modified example of the fuel cell stack in the present embodiment. As is illustrated in the figure, the fuel cell stack may employ a structure in which a sealing portion 25 having a tacking force seals gaps among an MEA 11 and separators 12a and 12b, and a sealing portion 24A having no tacking force seals gaps between unit cells 2'.

The fuel cell stack according to the present embodiment and the modified example shows the same effect as in the above described first embodiment, due to the above described structure, and besides can easily separate separators 12a and 12b in each unit cell 2'. Accordingly, the fuel cell stack can be handled while considering a cell as a unit and can make a sealing performance and a generating power evaluated on each cell as a unit, similarly to the case of a structure which employs an adhesive in a sealing portion among an MEA 11 and the separators 12a and 12b, though having a stacked structure in which all gaps are sealed by a gasket.

Incidentally, an ion exchanger of a fuel cell stack according to the present invention is not limited to an MEA which is integrated with a polymer electrolyte membrane and electrodes as described above, but may be composed of only the polymer electrolyte membrane or may be provided with other components, as long as the ion exchanger has at least the polymer electrolyte membrane.

A fuel cell stack according to the present invention can not only be easily disassembled into a bundle of a plurality of cells, but also be handled while considering a unit cell as a unit. As a result, a fuel cell stack according to the present invention can be widely used for a fuel cell stack having such a demand.

I claim:

1. A fuel cell stack comprising:
   a plurality of unit cells each formed of stacked ion-exchangers and separators; and
   a plurality of sealing portions for sealing gaps between the unit cells,
   wherein the sealing portions have different tacking forces depending on the position in a stacked direction of the unit cells, and a tacking force (A) in the unit cell, a tacking force (B) working in between the unit cells in a module provided with each of the plurality of unit cells, and a tacking force (C) working in between the modules satisfy a relationship of taking force (A)>tacking force (B)>tacking force (C).

2. A fuel cell stack comprising:
   a plurality of unit cells each formed of stacked ion-exchangers and separators; and
   a plurality of sealing portions for sealing gaps between the unit cells,
   wherein the sealing portions have different tacking forces depending on their position in a stacked direction of the unit cells; and
   wherein the fuel cell stack further comprises a plurality of modules each of which is formed of one or more of the plurality of unit cells by sealing the gaps between the unit cells with a tacking force (B) weaker than a tacking force (A) working in the unit cell, wherein a tacking force (C) working in between adjacent modules is weaker than the tacking force (B) working in between the unit cells.

3. A fuel cell stack comprising:
   a plurality of unit cells each formed of stacked ion-exchangers and separators; and
   a plurality of sealing portions for sealing gaps between the unit cells,
   wherein the sealing portions have different tacking forces depending on the position in a stacked direction of the unit cells, and
   wherein the plurality of sealing portions each have a portion at which a first tacking force working in between one unit cell and a unit cell stacked on one side in the stacked direction is weaker than a second tacking force working in between the one unit cell and a unit cell stacked on the other side in the stacked direction, wherein the second tacking force is equal to or weaker than a tacking force working in the unit cell.

4. A fuel cell stack comprising:
   a plurality of unit cells formed of stacked ion-exchangers and separators; and
   a plurality of gaskets for sealing gaps between separators in or between the unit cells,
   wherein the plurality of gaskets have different tacking forces depending on their position in a stacked direction of the unit cells, and
   wherein a tacking force (A) in the unit cell, a tacking force (B) working in between the unit cells in a module provided with a plurality of the unit cells, and a tacking force (C) working in between the modules satisfy a relationship of tacking force (A)>tacking force (B)>tacking force (C).

5. A fuel cell stack comprising:
a plurality of unit cells formed of stacked ion-exchangers and separators; and
a plurality of gaskets for sealing gaps between separators in the unit cell or between the unit cells,
wherein the plurality of gaskets have different tacking forces depending on their position in a stacked direction of the unit cells; and
wherein the fuel cell stack further comprises a plurality of modules each of which is formed by one or more unit cells in the plurality of unit cells by sealing the gaps between the unit cells with a tacking force (B) weaker than a tacking force (A) working in the unit cell, wherein a tacking force (C) working in between adjacent modules is weaker than the tacking force (B) working in between the unit cells.

6. A fuel cell stack comprising:
a plurality of unit cells formed of stacked ion-exchangers and separators; and
a plurality of gaskets for sealing gaps between separators in or between the unit cells,
wherein the plurality of gaskets have different tacking forces depending on their position in a stacked direction of the unit cells, and
wherein the plurality of gaskets each have a portion at which a first tacking force working in between one unit cell and a unit cell stacked on one side in the stacked direction is weaker than a second tacking force working in between the one unit cell and a unit cell stacked on the other side in the stacked direction, wherein the second tacking force is equal to or weaker than a tacking force working in the unit cell.

7. The fuel cell stack according to claim 4, wherein
one or more gaskets in the plurality of gaskets generate an intermolecular force or form an intermolecular bond with an opposite material contacting the one or more gaskets, the generated force or formed bond in the one or more gaskets being stronger than other gaskets in the plurality of gaskets.

8. The fuel cell stack according to claim 4, wherein
one or more gaskets in the plurality of gaskets have an adhesive on a surface of the one or more gaskets, or an opposite material contacting the one or more gaskets has an adhesive on its surface.

9. The fuel cell stack according to claim 4, wherein
one or more gaskets in the plurality of gaskets have fine recesses formed on a surface of the one or more gaskets.

10. The fuel cell stack according to claim 4, wherein
an opposite member contacting one or more gaskets in the plurality of gaskets has a surface that is mirror-finished.

11. The fuel cell stack according to claim 4, wherein
one or more gaskets in the plurality of gaskets generate a suppressed intermolecular force or form a suppressed intermolecular bond with an opposite member contacting the one or more gaskets, the force or bond being suppressed as compared to an intermolecular force or bond generated or formed with other of the gaskets in the plurality of gaskets.

12. The fuel cell stack according to claim 4, wherein
a first opposite member contacting one or more gaskets in the plurality of gaskets has a rougher surface than a second opposite member contacting another gasket in the plurality of gaskets.

13. The fuel cell stack according to claim 4, wherein the stack further includes:
a sealing portion comprising a gasket of the plurality of gaskets and a contacting portion of a separator, wherein the contacting portion contacts a head of the gasket.

14. The fuel cell stack according to claim 5, wherein
one or more gaskets in the plurality of gaskets generate an intermolecular force or form an intermolecular bond with an opposite material contacting the one or more gaskets, the generated force or formed bond in the one or more gaskets being stronger than other gaskets in the plurality of gaskets.

15. The fuel cell stack according to claim 6, wherein one or more gaskets in the plurality of gaskets generate an intermolecular force or form an intermolecular bond with an opposite material contacting the one or more gaskets, the generated force or formed bond in the one or more gaskets being stronger than other gaskets in the plurality of gaskets.

16. The fuel cell stack according to claim 5, wherein
one or more gaskets in the plurality of gaskets have an adhesive on a surface of the one or more gaskets, or an opposite material contacting the one or more gaskets has an adhesive on its surface.

17. The fuel cell stack according to claim 6, wherein
one or more gaskets in the plurality of gaskets have an adhesive on a surface of the one or more gaskets, or an opposite material contacting the one or more gaskets has an adhesive on its surface.

18. The fuel cell stack according to claim 5, wherein
one or more gaskets in the plurality of gaskets have fine recesses formed on a surface of the one or more gaskets.

19. The fuel cell stack according to claim 6, wherein
one or more gaskets in the plurality of gaskets have fine recesses formed on a surface of the one or more gaskets.

20. The fuel cell stack according to claim 5, wherein
an opposite member contacting one or more gaskets in the plurality of gaskets, the opposite member having a surface that is mirror-finished.

21. The fuel cell stack according to claim 6, wherein
an opposite member contacting one or more gaskets in the plurality of gaskets, the opposite member having a surface that is mirror-finished.

22. The fuel cell stack according to claim 5, wherein
one or more gaskets in the plurality of gaskets generate a suppressed intermolecular force or form a suppressed intermolecular bond with an opposite member contacting the one or more gaskets, the force or bond being suppressed as compared to an intermolecular force or bond generated or formed with other of the gaskets in the plurality of gaskets.

23. The fuel cell stack according to claim 6, wherein
one or more gaskets in the plurality of gaskets generate a suppressed intermolecular force or form a suppressed intermolecular bond with an opposite member contacting one or more gaskets, the force or bond being suppressed as compared to an intermolecular force or bond generated or formed with other of the gaskets in the plurality of gaskets.

24. The fuel cell stack according to claim 5, wherein
a first opposite member contacting one or more gaskets in the plurality of gaskets has a rougher surface than a second opposite member contacting another gasket in the plurality of gaskets.

25. The fuel cell stack according to claim 6, wherein
a first opposite member contacting one or more gaskets in the plurality of gaskets has a rougher surface than a second opposite member contacting another gasket in the plurality of gaskets.

* * * * *

UNITED STATES PATENT AND TRADEMARK OFFICE
CERTIFICATE OF CORRECTION

| | |
|---|---|
| PATENT NO. | : 7,892,695 B2 |
| APPLICATION NO. | : 11/885435 |
| DATED | : February 22, 2011 |
| INVENTOR(S) | : Chisato Kato |

It is certified that error appears in the above-identified patent and that said Letters Patent is hereby corrected as shown below:

| Column | Line | |
|---|---|---|
| 10 | 19 | Change "taking force (A)" to --tacking force (A)--. |
| 11 | 5 | Delete "the unit cell". |

Signed and Sealed this
Third Day of May, 2011

David J. Kappos
*Director of the United States Patent and Trademark Office*